INVENTOR
EARL E. TINKER

BY Norman S. Blodgett
ATTORNEY

United States Patent Office 2,792,120
Patented May 14, 1957

2,792,120
STRAINER

Earl E. Tinker, Decatur, Ill., assignor to A. W. Cash Company, Decatur, Ill., a corporation of Delaware Application July 16, 1953, Serial No. 368,411

5 Claims. (Cl. 210—308)

This invention relates to a strainer and more particularly to apparatus for insertion in a pipeline to remove foreign matter from fluid flowing therein.

In the past, many devices have been conceived and built for staining foreign matter from liquids flowing in conduits. However, many difficulties have been experienced with these prior art strainers, not the least of which is the fact that the filtering element, in order to be clamped properly, has to be unduly stressed and has a relatively short life. Also, the bodies of strainers that have been used heretofore have been difficult to machine. At the same time the prior art strainers have presented considerable resistance to the flow of the fluid which they were intended to clean. The present invention obviates these difficulties of the prior art in a novel manner.

It is therefore an outstanding object of the present invention to provide a strainer in which the screen or filtering element is securely clamped in place, but not unduly stressed.

Another object of the invention is the provision of a strainer having a means for clamping the screen element which is very simple and does not require machining.

A still further object of the present invention is the provision of a strainer which presents very little resistance to flow of liquid therethrough.

A still further object of the present invention is the provision of a strainer in which the liquid passing therethrough partakes of a substantially straight-through flow.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings.

Like reference characters denote similar parts in the several figures of the drawings.

Figure 3:
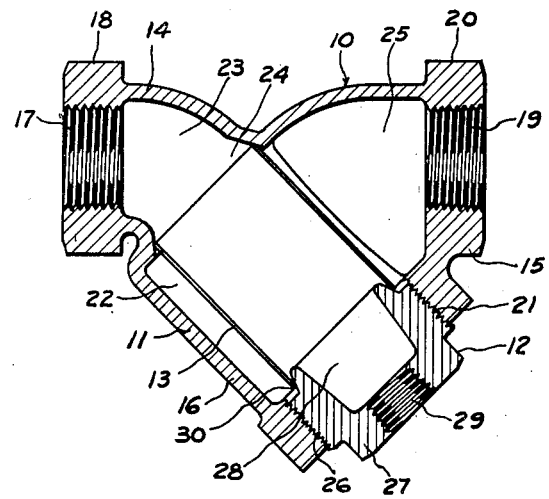
Figure 3 is a sectional view of the strainer taken on the line 3—3 of Figure 2.
Figure 2:
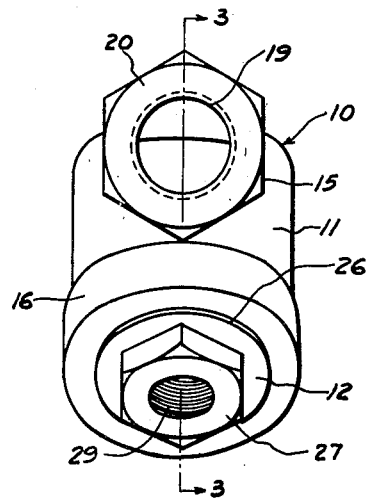
Figure 2 is an elevational view of the strainer looking along the centerline of the conduit into which the strainer will be inserted.
Figure 1:
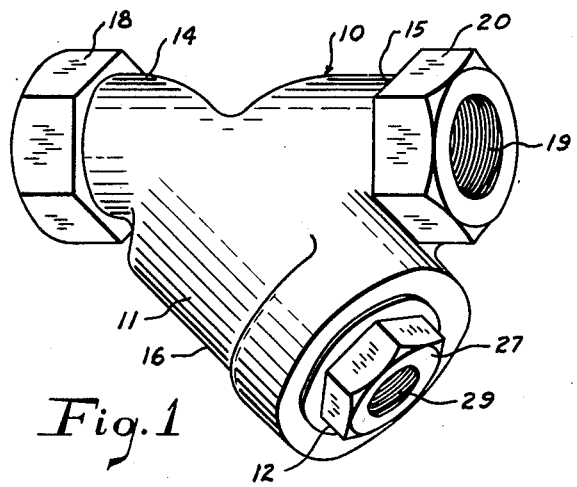
Figure 1 is a prospective view of the strainer of the invention.

Referring to the drawings, the strainer, generally designated by the reference numeral 10, comprises a body 11, a clamping member 12, and a screen 13. The screen 13 is tubular and is of a mesh construction such that the open area of the screen may be as much as four times the free pipe area. In order to provide so much open area in the screen, the screen must of necessity be of a weaker construction than is usual in such strainers. This is possible because of the unusual manner in which the screen is supported, as will be explained more fully hereinafter. The body 11 of the strainer is of a generally Y-shaped construction having in general an inlet leg 14, an outlet leg 15, and a cleaning leg 16. The inlet leg is provided with a tapped aperture 17 into which may be screwed the threaded pipe from which the liquid originates. The outer end of the inlet leg is provided with the usual hexagonal wrench surface 18. In a similar manner, the outlet leg 15 is provided with a tapped aperture 19 into which is threaded the pipe into which the liquid flows after it has been cleaned. The outlet leg 15 is also provided with the usual wrench surface 20. The centerlines of the tapped apertures 17 and 19 are exactly aligned. The cleaning leg 16 is also provided with a tapped aperture 21 into which the clamping member 12 is adapted to be threaded. The centerline of the tapped aperture 21 resides at an angle of approximately 45 degrees to the centerline of the apertures 17 and 19. The body 11 is provided with a screen chamber 22 which is coaxial with the tapped aperture 21 and considerably larger. The tapped aperture 17 merges into a passage 23 which is best described as a segment of an annulus. The diameter of a section of the passage 23 is considerably smaller than the diameter of the screen chamber 22. The passage 23 continues in its annular confirmation from the inner end of the tapped aperture 17 to a point where it interesects and is directed along the axis of the screen chamber 22. A transition surface 24 connects the passage 23 and the screen chamber 22 and also provides a clamping surface for the screen 13. The transition surface 24 is, of course, of a somewhat unusual shape because of the fact that it joins smoothly the cylindrical wall of the screen chamber 22 to the annular wall of the passage 23. The surface 24 might best be described as a very generous bevel.

At the outlet leg 15 of the body 11 a passage 25 joins the tapped aperture 19 to the screen chamber 22. This passage 25 is also an annular segment, the centerline of which is generally coaxial with the axis of tapped aperture 19 where it joins that aperture and is approximately perpendicular to the axis of the screen chamber 22 at the point where it intersects that chamber. The area of intersection of the passage 25 with the screen chamber 22 is generously beveled to provide smooth transition. The clamping member 12 is of a generally stubby cylindrical construction having a threaded portion 26 adapted to be threaded in the tapped aperture 21 and a reduced portion 27 intended to extend outwardly of the strainer body and provided with the usual hexagonal wrench surface. The end of the clamping member which is adapted to reside inside of the strainer is provided with a generally frusto-conical well 28 having a depth somewhat more than one-half the axial length of the clamping member. A threaded aperture 29 extends from the the outer end of the clamping member through to the well 28 and a plug, not shown, is usually threaded into this aperture during normal operation of the strainer. The inner end of the clamping member 12 is provided with an annular groove 30. The surface of the clamping member which defines this groove 30 is of a rather usual shape that might best be described as an ogee section in which the reversal of the curve takes place at just about the point on the clamping member which will be contacted by the end of the screen 13.

The operation of the strainer of the invention will now be clearly understood in view of the above description. In assembling the strainer, the tubular screen 13 is inserted through the aperture 21 in the leg 16 and one end rests against the intermediate portion of the transition surface 24. The clamping member 12 is then screwed in the aperture 21 and its inner end is inserted within the screen 13 so that the edge of the screen 13 contacts the central portion of the groove 30. Further axial motion of the clamping member, due to rotation by means of a wrench placed on the reduced portion 27, causes the screen to be compressed axially between the transition surface 24 and the groove 30 of the clamping member 12. Now screens which are used in strainers are usually formed of a rectangular piece of screening material bent into a tube so that there is a welded seam running longitudinally along the surface. In the usual strainer, compression of the screen takes place with considerable additional radial force. A study of the actions of forces on a tubular structure indicates that compressing forces, acting axially on the tube in addition to radial forces at the ends, cause circumferential stresses to take place which will open up any weak area such as a seam. It has been observed, however, that when axial compressive forces take place on a tube with an inward radial pressure at one end and an outward radial pressure at the other end, the tendency to open up a seam is minimized; thus the inward motion of the clamping member 12, while causing axial compressive forces on the screen 13, also causes the end which contacts the transition surface 24 to be subjected to radial forces acting inwardly, while the end which contacts the groove 30 is subject to forces acting radially outwardly. In this way the screen can be subjected to sufficient axial compressive forces to bring about good sealing, while at the same time not causing stresses within the walls of the screen which are liable to bring about opening of a seam.

Water or other liquid passing through the strainer enters through the aperture 17 and leaves through the aperture 19; first, however, passing through the passage 23 into the open end of the screen 13, and then flowing radially outwardly into the screen chamber 22 and through the passage 25. Because of the unusual clamping action which is used to hold and seal the screen 13, a screen may be used which has a very large percentage of open area, the open area being several times the section of pipe or conduit through which the liquid is passing. For this reason it is possible for the liquid, in passing from the passage 23 to the passage 25 to flow through only the portions of the screen which are intersected by the cylinder defined by the apertures 17 and 19. In this way the liquid is subject to straight-line flow. That is to say, the liquid in flowing from the aperture 17 to the aperture 19 may partake of a substantially straight flow, there being no necessity for the liquid to move down into the leg 16 in order to find an area of the screen 13 which is not already being occupied by other liquid. The screen can be cleaned by removing the plug which normally resides in the aperture 29 and allowing the liquid to blow down the foreign matter which is presumably collected in the well 28, for changing or cleaning of the screen 13 is only necessary, of course, to remove the clamping member 12.

Other modes of applying the principle of the invention may be employed, changes being made as regards the details described, provided the features stated in the following claims or the equivalent of such, be employed.

I therefore particularly point out and distinctly claim as my invention:

1. A strainer comprising a hollow body, a tubular screen, and a clamping member, the body having an apertured inlet leg, an apertured outlet leg, and a cleaning leg having a tapped aperture, the apertures in the inlet and outlet legs being coaxial, while the axis of the aperture in the cleaning leg lies at a substantial angle thereto, the clamping member being threaded for insertion into the aperture in the cleaning leg and having an annular groove at its inner end, such that the clamping member resides in one end of the screen, the surface of the groove having a smooth curvature which is substantially tangential to and in line contact with the inside surface of the screen at the area of contact and serving to press outwardly on the end of the screen that lies thereagainst, the inner surface of the hollow body being formed with a portion having a curved surface of revolution coaxial with the aperture in the cleaning leg, the curved portion converging gently toward the aperture in the inlet leg and serving to press inwardly on the end of the screen that lies thereagainst.

2. A strainer comprising a body, a tubular screen, and a clamping member, the body having an inlet leg with an aperture leading into a passage which is substantially a segment of a toroid, an outlet leg having an aperture leading into a passage which is substantially a segment of a toroid, and a cleaning leg having a tapped aperture leading into a cylindrical chamber, the apertures in the inlet and outlet legs being coaxial, while the axis of the aperture in the cleaning leg lies at a substantial angle thereto, the clamping member being threaded for insertion into the aperture in the cleaning leg and having an annular groove at its inner end such that the clamping member resides in one end of the screen, the surface of the groove having a smooth curvature, which is substantially tangential to and in line contact with the inside surface of the screen at the area of contact and serves to press radially outwardly on the end of the screen in contact therewith, a transition surface between the adjacent ends of the cleaning leg chamber and the inlet leg passage being a curved surface of revolution coaxial with the aperture in the cleaning leg, the curved portion converging gently toward the aperture in the inlet leg and serving to press inwardly on the end of the screen that lies thereagainst.

3. The strainer comprising a body, a tubular screen, and a clamping member, the body having an inlet leg with an aperture leading into a passage, an outlet leg having an aperture leading into a passage, and a cleaning leg having a tapped aperture leading into a cylindrical chamber, the apertures in the inlet and outlet legs being coaxial, while the axis of the aperture in the cleaning leg lies at a substantial angle thereto, the clamping member being threaded for insertion into the aperture in the cleaning leg and having an annular groove at its inner end such that the clamping member resides in one end of the screen, the surface of the groove having a smooth curvature which is substantially tangential to and in line contact with the inside surface of the screen at the area of contact and presses radially outwardly on the end of the screen contacted thereby, a transition surface between the adjacent ends of the cleaning leg chamber and the inlet leg passage which is a curved surface of revolution coaxial with the aperture in the cleaning leg, the curved portion converging gently toward the aperture in the inlet leg and serving to press inwardly on the end of the screen that lies against, the said transition surface being adjacent to the axes of the inlet and outlet leg apertures so that a considerable portion of the screen lies within the cylindrical surface defined by the said apertures.

4. A strainer comprising a body, a tubular screen, and a clamping member, the body having an inlet leg having a passage extending longitudinally thereof, an outlet leg having a passage extending longitudinally thereof, and a cleaning leg having a tapped aperture leading into a cylindrical chamber, the inlet and outlet legs being generally coaxial, while the axis of the aperture in the cleaning leg lies at a substatial angle thereto, the clamping member being threaded for insertion into the aperture in the cleaning leg and having an annular groove at its end such that the clamping member resides in one end of the screen, the surface of the groove having a smooth curvature of generally ogee section the reversal of curvature of which takes place in a position of line contact with the inside surface of the screen so that the surface presses radially outwardly on the end of the screen in which it lies, a transition surface between the adjacent ends of the cleaning leg chamber and the inlet leg passage, which is a surface of revolution coaxial with the aperture in the cleaning leg, the transition surface converging gently toward the inlet leg and pressing inwardly on the end of the screen that lies thereagainst, the said transition surface being adjacent to the centerlines of the inlet and outlet legs so that a considerable portion of the screen lies within the cylindrical surface defined by the said legs.

5. A strainer comprising a body, a tubular screen of large open area, and a clamping member, the body having an inlet leg having a passage extending longitudinally thereof, an outlet leg having a passage extending longitudinally therethrough, and a cleaning leg having a tapped aperture leading into a cylindrical chamber, the inlet and outlet legs being generally coaxial, while the axis of the aperture in the cleaning leg lies at a substantial angle thereto, the clamping member being threaded for insertion into the aperture in the cleaning leg and having an annular groove at its inner end such that the clamping member resides in one end of the screen, the surface of the groove having a smooth curvature of generally ogee section the reversal of curvature of which takes place in a position of line contact with the inside surface of the screen, the surface pressing radially outwardly on the end of the screen contacted thereby, a transition surface between the adjacent ends of the cleaning leg chamber and the outlet leg passage which is a curved surface of revolution coaxial with the aperture in the cleaning leg, the transition surface converging gently toward the inlet leg and pressing inwardly on the end of the screen that lies thereagainst, the said transition surface being adjacent to the axes of the inlet and outlet legs so that a considerable portion of the screen lies within the cylindrical surface defined by the said legs, the clamping member having a well at its inner end and a threaded cleaning aperture, the passages in the inlet and outlet legs being substantially toroidal segments.

References Cited in the file of this patent
UNITED STATES PATENTS

| | | |
|---|---|---|
| 1,033,544 | Collins | July 23, 1912 |
| 1,169,792 | French | Feb. 1, 1916 |
| 1,273,656 | Paget | July 23, 1918 |
| 1,483,285 | De Coster | Feb. 12, 1924 |
| 1,687,292 | Grant | Oct. 9, 1928 |
| 2,583,522 | Winslow et al. | Jan. 22, 1952 |
| 2,610,741 | Schmid | Sept. 16, 1952 |
| 2,669,359 | Mankin | Feb. 16, 1954 |
| 2,714,455 | Galloway | Aug. 2, 1955 |